United States Patent
Stuckey (10) Patent No.: US 12,024,302 B2
(45) Date of Patent: Jul. 2, 2024

(54) HYBRID STARTER MOTOR-GENERATOR

(71) Applicant: Rolls-Royce Corporation, Indianapolis, IN (US)

(72) Inventor: Claire Elizabeth Stuckey, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 5 days.

(21) Appl. No.: 16/171,896

(22) Filed: Oct. 26, 2018

(65) Prior Publication Data

US 2020/0130853 A1    Apr. 30, 2020

(51) Int. Cl.
*F02C 7/36* (2006.01)
*B64D 27/12* (2006.01)
*F01D 15/10* (2006.01)
*B64D 27/02* (2006.01)

(52) U.S. Cl.
CPC .............. *B64D 27/12* (2013.01); *F01D 15/10* (2013.01); *F02C 7/36* (2013.01); *B64D 2027/026* (2013.01); *F05D 2220/323* (2013.01); *F05D 2220/76* (2013.01)

(58) Field of Classification Search
CPC .. F05D 2220/76; F05D 2220/323; F02C 9/56; F02C 3/107; F02C 3/113; F02C 7/32; F02C 7/36; F02D 15/10; B64D 2027/026; B64D 2027/005; B64D 35/02; B64D 35/04; B64D 35/08; F02K 3/077; F02K 3/025
See application file for complete search history.

(56) References Cited

U.S. PATENT DOCUMENTS

| | | | | |
|---|---|---|---|---|
| 7,791,235 B2* | 9/2010 | Kern | ....................... | F02C 3/113 310/103 |
| 7,970,497 B2* | 6/2011 | Derouineau | ........... | B64D 13/06 701/3 |
| 8,099,944 B2* | 1/2012 | Foster | .................... | B64D 31/04 60/788 |
| 9,212,625 B2* | 12/2015 | Shelley | .................... | F02K 5/00 |
| 2015/0361880 A1 | 12/2015 | Suciu et al. | | |

(Continued)

FOREIGN PATENT DOCUMENTS

EP    2452876 A2    5/2012

OTHER PUBLICATIONS

Fitz et al., "Design, Fabrication, and Testing of a High-Speed, Over-Running Clutch for Rotorcraft", Aug. 1998, 79 pgs.

(Continued)

*Primary Examiner* — Todd E Manahan
*Assistant Examiner* — Sean V Meiller
(74) *Attorney, Agent, or Firm* — Shumaker & Sieffert, P.A.

(57) ABSTRACT

An example hybrid propulsion system is described that includes a plurality of propulsors, a first drive shaft, a second drive shaft, a gas turbine engine, a motor-generator, and a clutch. The gas turbine engine includes a first turbine stage operatively coupled to the first drive shaft and a second turbine stage operatively coupled to the second drive shaft. The motor-generator is operatively coupled to the second drive shaft and is configured to generate electrical power to drive at least one propulsor of the plurality of propulsors and selectively drive the second shaft. The clutch is configured to operatively couple the second drive shaft to the first drive shaft.

13 Claims, 5 Drawing Sheets

(56) References Cited

U.S. PATENT DOCUMENTS

| | | | |
|---|---|---|---|
| 2015/0377142 A1* | 12/2015 | Sheridan | F02C 7/275 |
| | | | 60/778 |
| 2016/0304211 A1* | 10/2016 | Swann | B64D 27/24 |
| 2018/0134396 A1* | 5/2018 | Blumer | B64D 13/06 |
| 2018/0178920 A1 | 6/2018 | Swann et al. | |
| 2018/0372588 A1* | 12/2018 | Hon | B64D 27/16 |
| 2019/0323426 A1* | 10/2019 | Mackin | F02C 9/20 |

OTHER PUBLICATIONS

Response to Extended European Search Report from EP Application No. 19200333.3 dated Mar. 13, 2020, filed Oct. 16, 2020, 12 pgs.

Extended European Search Report from EP Application No. 19200333.3 dated Mar. 13, 2020, 7 pgs.

Examination Report from counterpart European Application No. 19200333.3, dated Oct. 1, 2021, 4 pp.

Response to Communication Pursuant to Rules 161(1) and 162 EPC dated Oct. 1, 2021, from counterpart European Application No. 19200333.3, filed Jan. 21, 2022, 7 pp.

Response to Communication pursuant to Article 94(3) EPC dated Jun. 1, 2023, from counterpart European Application No. 19200333.3 filed Sep. 27, 2023, 6 pp.

Communication pursuant to Article 94(3) EPC from counterpart European Application No. 19200333.3 dated Jun. 1, 2023, 5 pp.

\* cited by examiner

HYBRID STARTER MOTOR-GENERATOR

TECHNICAL FIELD

The present disclosure relates to hybrid propulsion systems for gas turbine engine systems, such as aircraft.

BACKGROUND

Some propulsion systems can be described as "hybrid propulsion systems" for deriving motive power, such as thrust, from one or more electrical power sources. For example, a hybrid aircraft may include a hybrid propulsion system that derives power (e.g., for producing thrust) from an electric generator and/or motor driven by a gas turbine engine. Some hybrid propulsion systems may use electrical machines, such as electric starter motors, to assist the gas turbine engine and generators to produce electricity.

SUMMARY

In general, the disclosure is directed to a hybrid propulsion system including a motor-generator in place of a typical accessory gearbox of a two-stage turbine gas turbine engine. The motor-generator may be configured to provide shaft power to a first drive shaft of the first stage turbine via a second drive shaft of second stage turbine during start-up and derive electrical power from shaft work of the second drive shaft during normal operation. The hybrid propulsion system includes a clutch configured to operatively couple the second drive shaft to the first drive shaft during start-up and decouple the first drive shaft from the second drive shaft during normal operation.

In some examples, the present disclosure is directed to a hybrid propulsion system including a plurality of propulsors, a first drive shaft, a second drive shaft, a gas turbine engine, a motor-generator, and a clutch. The gas turbine engine may include a first turbine stage operatively coupled to the first drive shaft and a second turbine stage operatively coupled to the second drive shaft. The motor-generator may be operatively coupled to the second drive shaft and configured to generate electrical power to drive at least one propulsor of the plurality of propulsors and selectively drive the second shaft. The clutch may be configured to operatively couple the second drive shaft to the first drive shaft.

In some examples, the present disclosure is directed to a method of starting a hybrid propulsion system including a plurality of propulsors, a gas turbine engine, a motor-generator, and a clutch. Each respective propulsor of the plurality of propulsors may include a respective electrical motor mechanically coupled to a respective propeller. The gas turbine engine may include a first turbine stage operatively coupled to a first drive shaft and a second turbine stage operatively coupled to a second drive shaft. The motor-generator may be directly mechanically coupled to the second drive shaft. The motor-generator may be configured to generate electrical power to drive at least one motor of the plurality of propulsors during a steady-state operation of the gas turbine engine and selectively drive the second shaft during a start-up operation of the gas turbine engine. The clutch may be coupled to the second drive shaft and configured to automatically engage the first drive shaft during the start-up operation and automatically disengage the first drive shaft during the steady-state operation.

In some examples, the present disclosure is directed to method of operating a hybrid propulsion system. The method may include generating, by a motor-generator, shaft work to drive a second drive shaft. The second drive shaft may be operatively coupled to a gas turbine engine. The gas turbine engine may include a first turbine stage operatively coupled to a first drive shaft; and a second turbine stage operatively coupled to the second drive shaft. The method also may include engaging, by a clutch operatively coupled to the second drive shaft, the first drive shaft in response to a first rotational rate of the first drive shaft. The method also may include disengaging the clutch from the first drive shaft in response to a second rotational rate of the first drive shaft.

The details of one or more examples are set forth in the accompanying drawings and the description below. Other features, objects, and advantages will be apparent from the description and drawings, and from the claims.

DETAILED DESCRIPTION

The present disclosure is directed to hybrid propulsion systems and techniques that include a plurality of propulsors, a first drive shaft, a second drive shaft, a gas turbine engine, a motor-generator, and a clutch. The gas turbine engine may include a first turbine stage operatively coupled to the first drive shaft and a second turbine stage operatively coupled to the second drive shaft. The motor-generator may be operatively coupled to the second drive shaft. By operatively coupling to the second drive shaft, the motor-generator may be configured to selectively drive the second shaft and generate electrical power to drive at least one propulsor of the plurality of propulsors. The clutch may be configured to operatively couple the second drive shaft to the first drive shaft.

The first turbine stage (N1) may include a gas producer turbine configured to drive a compressor of the gas turbine engine and, in some examples, self-sustaining systems of the hybrid propulsion system, such as oil pumps and/or fuel pumps. The second turbine stage (N2) may include a power turbine configured to drive the plurality of propulsors and, in some examples, accessories of the vehicle. In some examples, N2 may drive the motor-generator, which produces electricity to power the plurality of propulsors.

The gas turbine engine may include various operational modes, such as start-up, steady-state operation, and shutdown. During start-up, shaft work may be necessary to begin rotation of the compressor to deliver air to the combustion chamber of the gas turbine engine to prevent a hot start. In some examples, shaft work may be delivered from the motor-generator to N2. N2 may be operatively coupled via a clutch to N1 to begin rotation of the compressor. The shaft work may be used to increase the rotational speed, e.g., revolutions per minute (RPM), of N1. At a predetermined RPM of N1 (e.g., ignition RPM), fuel may be delivered to and ignited in a combustion chamber of the gas turbine engine. The ignition of fuel may result in expansion of gases in the combustion chamber sufficient to drive N1 and N2 to achieve self-sustaining combustion of steady-state operation. Before ignition, e.g., during start-up, N1 and N2 may rotate at the same or nearly the same RPM. After ignition, e.g., during steady-state operation, N1 may rotate faster than N2. N1 and N2 may be configured to operate at different rotational speed to drive different operational system of a vehicle. In some examples, N1 may rotate at up to about 50,000 RPM and N2 may rotate at up to about 30,000 RPM.

In some examples, the motor-generator may be positioned within an existing casing of a gas turbine engine. For example, the motor-generator may be configured to replace the power and accessory gearbox (the "accessory gearbox") of a turboshaft gas turbine engine, such as a gas turbine engine configured for use in a rotary-wing vehicle. Using a generator-motor, rather than a dedicated electric starter motor (or other starter system) and a dedicated generator, may reduce accessory drive mechanisms and, thereby, reduce the number of mechanical systems, reduce weight of the hybrid propulsion system, or both compared to other propulsion systems.

However, while the motor-generator may be operatively coupled to N2 via direct mechanical coupling to the second drive shaft, e.g., to generate electrical power from shaft work of N2, the motor-generator may not be directly coupled to N1 or the first drive shaft. For example, the additional gearing and/or additional accessories to enable the motor-generator to couple to both N1 and N2 may be complex and/or lessen the benefits of using a generator-motor, rather than a dedicated electric starter motor and a dedicated generator. Thus, the hybrid propulsion system may include a clutch configured to operatively couple the second drive shaft to the first drive shaft.

For example, during start-up, the motor-generator (coupled to N2 via the second drive shaft) may produce shaft work to drive the second shaft. The clutch may operatively couple the second drive shaft to the first drive shaft. In some examples, the clutch may include an overrunning clutch. For example, the clutch may include an overrunning sprag clutch. An overrunning sprag clutch may be relatively smaller and relatively less weight than other clutch systems. The clutch may be coupled to the second drive shaft and configured to engage the first drive shaft only when the first and second drive shafts are rotating at the same speed. For example, when second drive shaft is being driven by the motor-generator during start-up, e.g., at a first rotational speed between substantially zero RPM to the ignition RPM, the clutch may automatically couple the second drive shaft to the first drive shaft. By automatically coupling the second drive shaft to the first drive shaft at a first rotational speed, the hybrid propulsion system may not require additional control systems to enable an operator to manually couple the second drive shaft to the first drive shaft.

The clutch may be configured to disengage from the first drive shaft when the first driven shaft rotates faster than the second drive shaft. For example, when the expansion of hot combustion gases causes N1 to drive (and accelerate) the rotation of the first drive shaft after ignition, e.g., at a second rotational speed greater than the ignition RPM, the clutch may automatically decouple the first drive shaft from the second drive shaft. Because N2 remains operatively coupled to the motor-generator, the motor-generator may be configured to generate electrical power to drive at least one propulsor of the plurality of propulsors during steady-state operation of the gas turbine engine. By automatically decoupling the first drive shaft from the second drive shaft at a second rotational speed, the hybrid propulsion system may not require additional control systems to detect when the RPM of the first drive shaft should begin to exceed the RPM of the second drive shaft, to enable an operator to manually decouple the first drive shaft from the second drive shaft, or both. In this way, the clutch may engage the first drive shaft and the second drive shaft during start-up and disengage the first drive shaft and the second drive shaft during steady-state operation.

Figure 1:
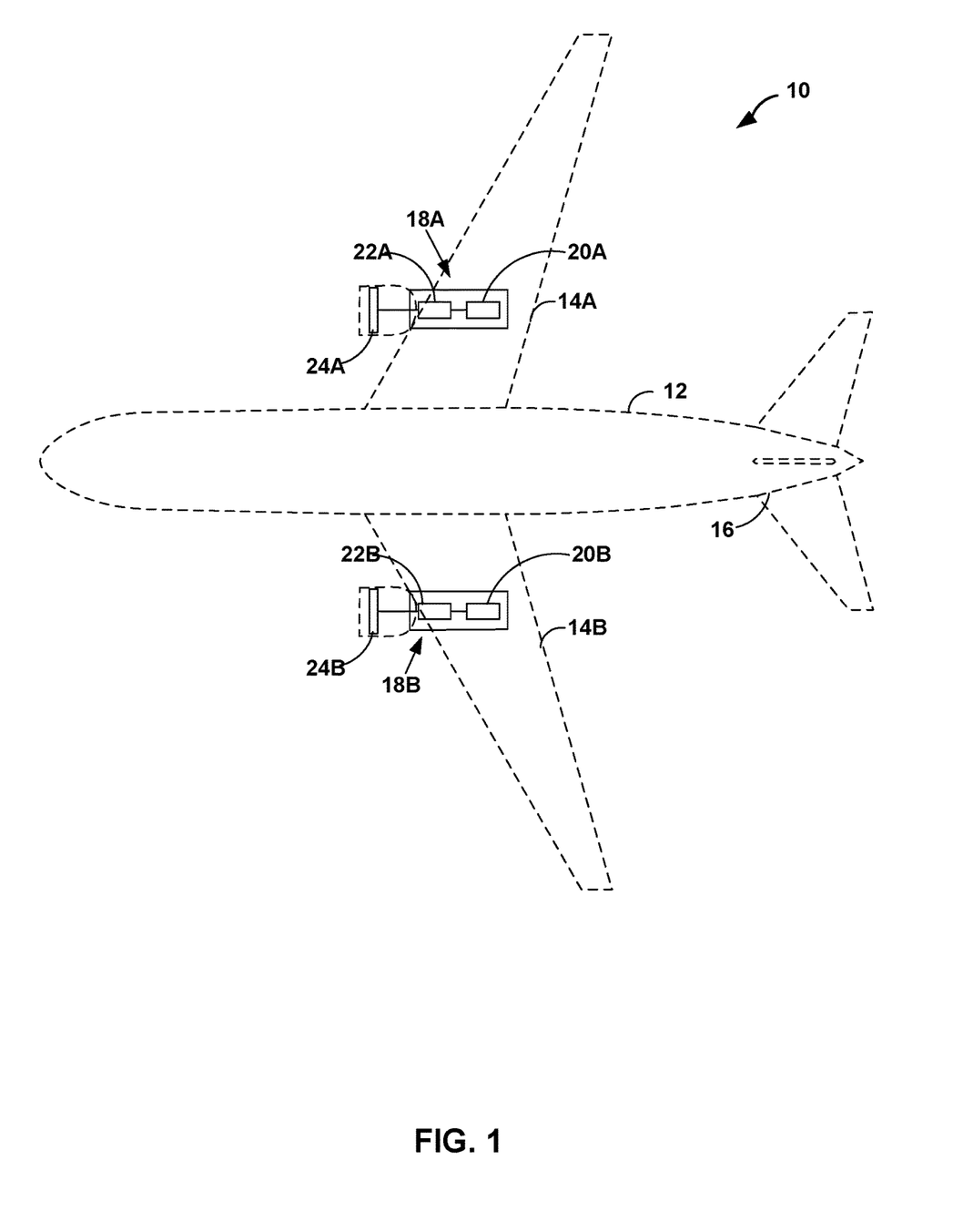
FIG. 1 is a conceptual diagram illustrating an example system, in accordance with an example of the present disclosure.

FIG. 1 is a conceptual diagram illustrating an example system 10 (also referred to herein as "vehicle 10" although non-vehicle examples of system 10, such as power stations, and the like, are also possible). In some examples, vehicle 10 includes an aircraft. In other examples, vehicle 10 may include any type of gas turbine engine-powered vehicle, including one or more types of air vehicles; land vehicles, including but not limited to, tracked and/or wheeled vehicles; marine vehicles, including but not limited to surface vessels, submarines, and/or semi-submersibles; amphibious vehicles; or any combination of one or more types of air, land, and marine vehicles. Vehicle 10 may be manned, semiautonomous, or autonomous.

In examples in which vehicle 10 includes an aircraft, vehicle 10 may include a fuselage 12, wings 14, an empennage 16, and multiple hybrid propulsion systems 18A and 18B (collectively, "hybrid propulsion systems 18"). In other examples, vehicle 10 may include a single hybrid propulsion system 18 or more than two hybrid propulsion systems 18.

In some examples, hybrid propulsion systems 18 may include one or more gas turbine engines 20A and 20B (collectively, "gas turbine engines 20"), one or more motor-generators 22A and 22B (collectively, "motor-generators 22"), and one or more propulsors 24A and 24B (collectively, "propulsors 24"). In some examples, gas turbine engines 20 may be configured to generate shaft work that is used by motor-generators 22 to produce electricity to power propulsors 24.

Vehicle 10 may include one or more gas turbine auxiliary power units (APUs). An APU may include, for example, a secondary gas turbine engine, a piston engine, a hybrid engine, or the like. Propulsors 24 may include fans, rotary wings, propellers, or the like. Although illustrated in FIG. 1 as collocated in respective wings 14 of vehicle 10, in some examples, any one or more of gas turbine engines 20, motor-generators 22, and/or propulsors 24 may be located in other portions of vehicle 10. For example, gas turbine engines 20 and/or motor-generators may be located in fuselage 12 and propulsors 24 may be located at wings 14 and/or empennage 16.

In some examples, vehicle 10 may be any fixed-wing aircraft. Vehicle 10 may employ any number of wings 14. Empennage 16 may employ a single or multiple flight control surfaces. In some examples, vehicle 10 may be a rotary-wing aircraft or a combination rotary-wing/fixed-wing aircraft. In some examples, hybrid propulsion systems 18 may include a distributed propulsion system. For example, propulsors 24 may be distributed on any suitable surface of vehicle 10, such as on any suitable portion of fuselage 12, wings 14, and empennage 16. In some examples, propulsors 24 of a distributed propulsion system may be configured to ingest air at a boundary layer of vehicle 10. The boundary layer may include the region of turbulent (or laminar) flow as vehicle 10 moves through a fluid (e.g., air or water). In some examples, gas turbine engine 20 may include a two-stage turbine gas turbine engine modified to include a motor-generator.

Figure 2:
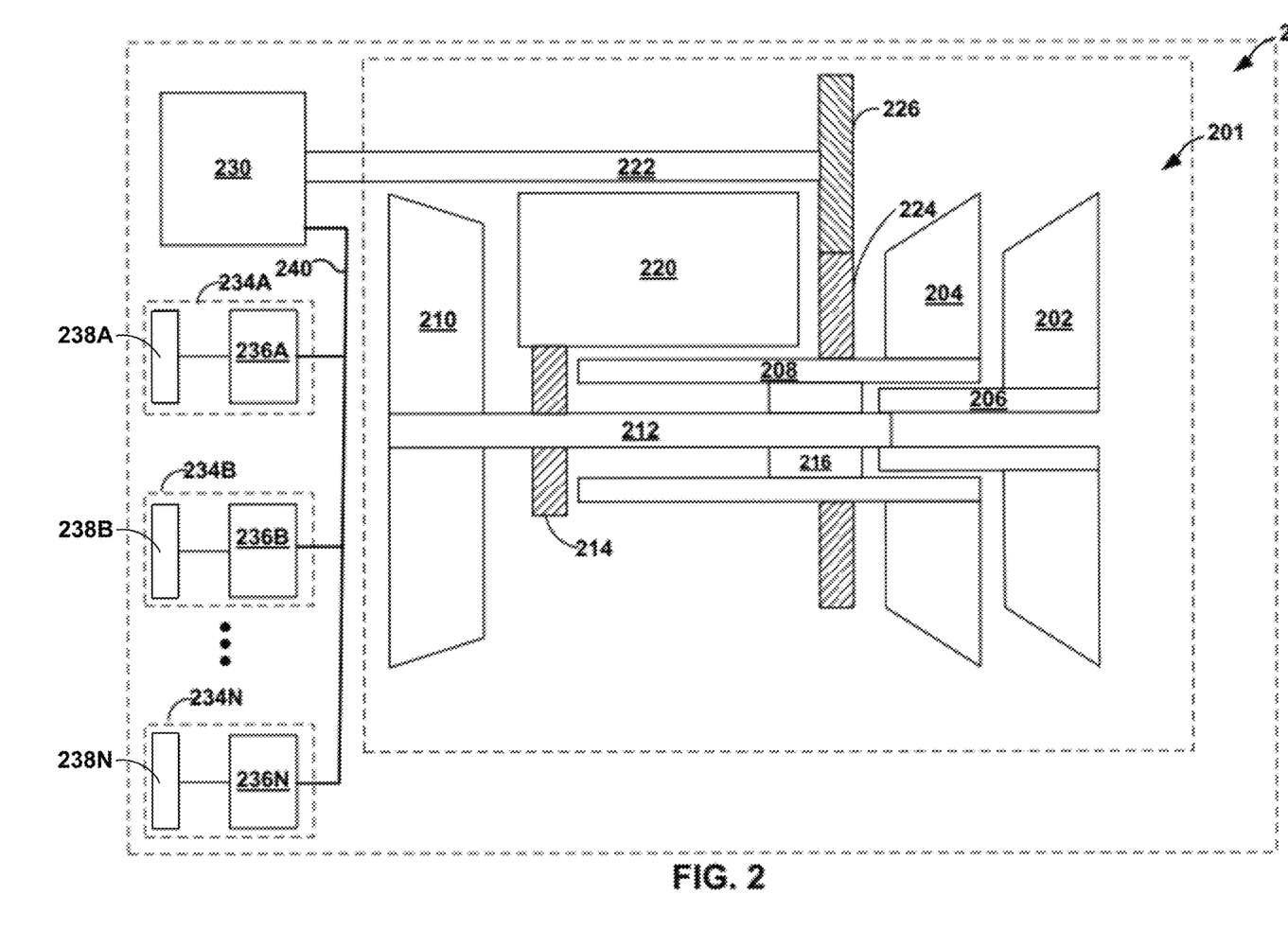
FIG. 2 is a conceptual diagram illustrating an example propulsion system, in accordance with an example of the present disclosure.

FIG. 2 is a conceptual diagram illustrating an example hybrid propulsion system 200 including a two-stage turbine gas turbine engine 201 ("engine 201"). In some examples, engine 201 may include a turbo shaft gas turbine engine. Engine 201 may include first turbine stage 202 and second turbine stage 204. In some examples, each of first turbine stage 202 and second turbine stage 204 may include one or more turbine wheels, such as, for example, two turbine wheels. In this way, each of first turbine stage 202 and second turbine stage 204 may include multiple turbine stages. First turbine stage 202 may be operatively coupled to first drive shaft 206. For example, first turbine stage 202 may be directly mechanically coupled to first drive shaft 206 or mechanically coupled to first drive shaft 206 via one or more intermediate mechanical couplings, such as a collar or a mechanical gearing. In this way, first turbine stage 202 may rotate at the same RPM as first drive shaft 206 (or a ratio thereof). Similarly, second turbine stage 204 may be operatively coupled to second drive shaft 208. In some examples, first drive shaft 206 may be coaxially positioned within a hollow shaft of second drive shaft 208 along a common axis. In other examples, second drive shaft 208 may be coaxially positioned within a hollow shaft of first drive shaft 206. First turbine stage 202 and second turbine stage 204 include a plurality of turbine blades and a plurality of stator blades. In some examples, the plurality of turbine blades and the plurality of stator blades of each of the first turbine stage 202 and second turbine stage 204 are configured to rotate first drive shaft 206 and second drive shaft 208 in the same direction.

First drive shaft 206 may be operatively coupled to compressor 210 via a spur adapter gear shaft 212. Compressor 210 may include one or more rotors configured to ingest and compress air to deliver to the combustion system fluidly coupled to first turbine 202 and second turbine 204 (e.g., such that fluid may flow from compressor 210 to the combustion system to first turbine 202 and second turbine 204). In some examples, the combustion system may include a combustion liner (not shown) that encloses a continuous combustion process. In other examples, combustion system may include other combustion processes, such as, for example, a wave rotor combustion system, a rotary valve combustion system, a pulse detonation combustion system, or a slinger combustion system, and may employ deflagration and/or detonation combustion processes. The plurality of turbine blades and the plurality of stator blades of each of the first turbine stage 202 and second turbine stage 204 are configured to derive shaft work from a flow of combustion gas from the combustion system. In this way, first drive shaft 206 may be configured to rotate compressor 210 at the same RPM as first turbine stage 202.

Second drive shaft 208 may be operatively coupled to generator drive shaft 222 via second turbine stage gear 224 and generator draft shaft gear 226. Generator drive shaft 222 may be operatively coupled to generators 230.

Generator 230 may be configured to generate electrical power from generator drive shaft 222. Generator 230 may supply electrical power via electrical system 240 to plurality of propulsors 234A, 234B, and 234N (collectively, propulsors 234). Electrical system 240 may include suitable electrical transmission lines, converters, inverters, power sources (e.g., batteries), or the like configured to transmit and/or store electrical energy such that generator 230 may power propulsors 234.

Although shown as including "n" propulsors, in other examples, propulsors 234 to fewer propulsors, such as one or two propulsor. Each propulsor of propulsors 234 may be mechanically coupled to a respective motor of plurality of motors 236A, 236B, and 236N (collectively, motors 236) configured to convert electrical power produced by generator 230 into mechanical power, e.g., shaft work. The shaft work produced by motors 236 may be delivered to respective propellers of plurality of propellers 238A, 238B, and 238N (collectively propellers 238). In some examples, propellers 238 may include other configurations, such as fans or rotary-wings.

In some examples, spur adapter gear shaft 212 may be coupled to a first turbine stage bearing 216. First turbine stage bearing 216 may be configured to stabilize an axial position of spur adapter gear shaft 212 relative to second drive shaft 208. In some examples, first drive shaft, e.g., via spur adapter gear shaft 212, may be operatively coupled by first turbine stage gear 218 to accessory gear box 220. Accessory gear box 220 may be positioned axial near a center of engine 201. In some examples, accessory gearbox 220 may be operatively coupled to a starter (not shown), such an electric starter motor, an air-starter turbine, an auxiliary power unit, or the like. In this way, accessory gearbox 220 may be configured to rotate first drive shaft 206 during startup of engine 201. In some examples, a gas turbine engine may include a motor-generator in place of an accessory gearbox.

Figure 3:
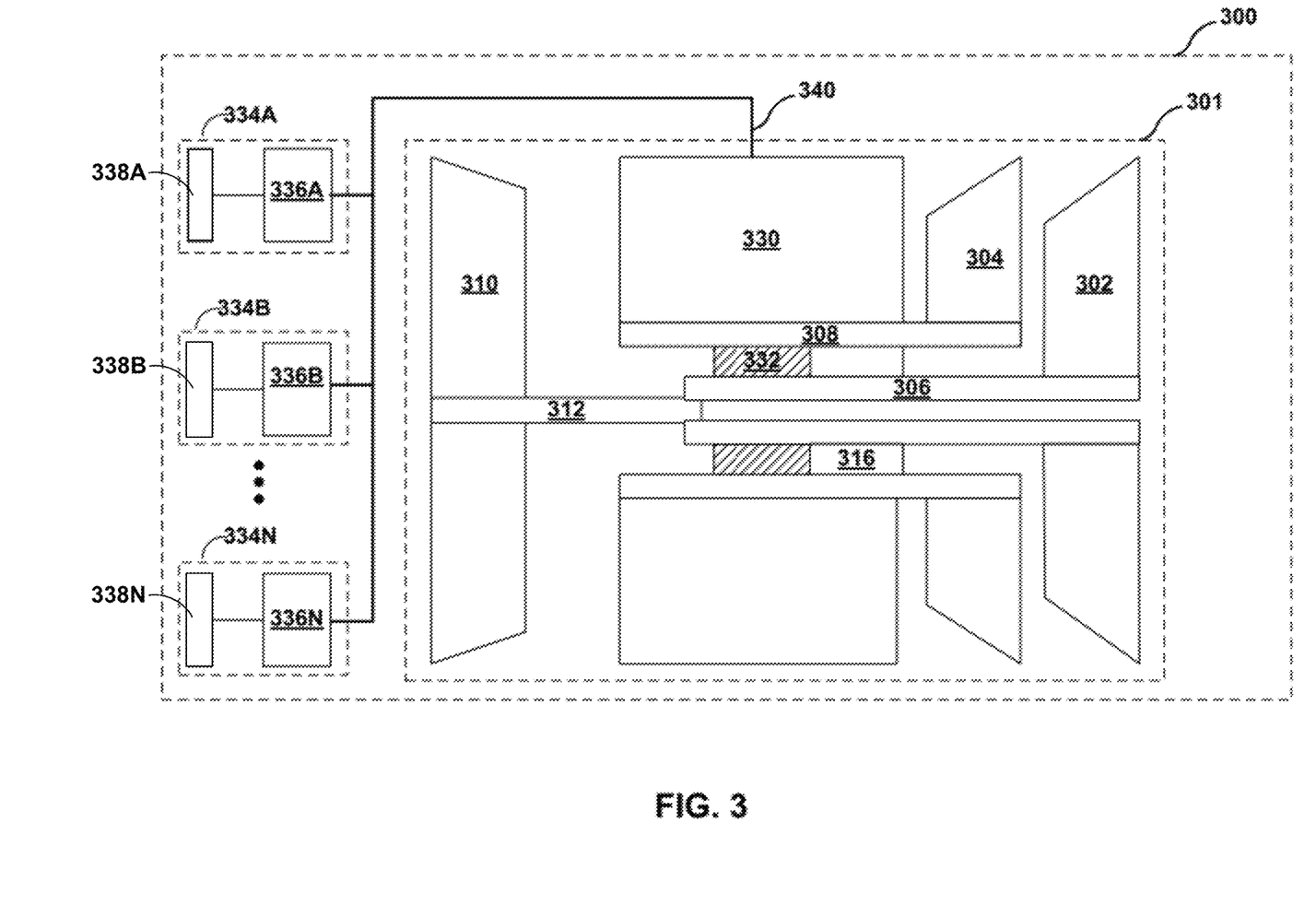
FIG. 3 is a conceptual diagram illustrating an example hybrid propulsion system including a two-stage turbine gas turbine engine that includes a starter motor-generator, in accordance with an example of the present disclosure.

FIG. 3 is a conceptual diagram illustrating an example hybrid propulsion system 300 including a two-stage turbine gas turbine engine 301 ("engine 301") that includes a motor-generator 330. Engine 301 may be the same as or substantially similar to engine 201 except for the differences described herein. For example, engine 301 may include first turbine stage 302 and second turbine stage 304. First turbine stage 302 may be operatively coupled to first drive shaft 306. First drive shaft 306 may be operatively coupled to compressor 310 via a spur adapter gear shaft 312. Second turbine stage 304 may be operatively coupled to second drive shaft 308. Spur adapter gear shaft 312 may be coupled to a first turbine stage bearing 316, which may be configured to stabilize an axial position of spur adapter gear shaft 312 relative to second drive shaft 308.

Rather than an accessory gearbox (e.g., accessory gearbox 220), engine 301 includes motor-generator 330. Motor-generator 330 may be operatively coupled to second drive shaft 308. For example, motor-generator 330 may be directly mechanically coupled to second drive shaft 208 or mechanically coupled to second drive shaft 308 via one or more intermediate mechanical couplings, such as a collar or a mechanical gearing. Motor-generator 330 may be configured to be positioned in the space of accessory gearbox 220, e.g., near a center of engine 301, which may limit the size of motor-generator, the type of mechanical coupling to operatively couple motor-generator 330 to second drive shaft 308, or both. In some examples, motor-generator 330 is configured to convert mechanical power to electrical power and to convert electrical power to mechanical power. For example, motor-generator 330 may be configured to derive electrical power from shaft work of second drive shaft 308, e.g., during steady-state operation, and deliver shaft power to second drive shaft 308, e.g., during start-up.

In some examples, motor-generator may be configured to generate between 50 kilowatts (kW) and about 500 kW of electrical power.

Motor-generator 330 may supply electrical power via electrical system 340 to plurality of propulsors 334A, 334B, and 334N (collectively, propulsors 334). Electrical system 340 may include suitable electrical transmission lines, converters, inverters, power sources (e.g., batteries), or the like configured to transmit and/or store electrical energy such that motor-generator 340 may power propulsors 334. Although shown as including "n" propulsors, in other examples, motor-generator 330 may supply electrical power to fewer propulsors, such as one or two propulsor. Each propulsor of propulsors 334 may be mechanically coupled to a respective motor of plurality of motors 336A, 336B, and 336N (collectively, motors 336) configured to convert electrical power produced by motor-generator 330 into mechanical power, e.g., shaft work. The shaft work produced by motors 336 may be delivered to respective propellers of plurality of propellers 338A, 338B, and 338N (collectively propellers 338). In some examples, propellers 338 may include other configurations, such as fans or rotary-wings.

In some examples, motor-generator 330 may be configured to power other electrical systems of a vehicle (e.g., vehicle 10). The other electrical systems may include, for example, electrical power distribution systems, power conversion systems, power electronics, digital electronics, and environmental control systems. For example, motor-generator 330 may be electrically coupled to, and configured to store electrical energy in, a power source, such as one or more batteries.

Additionally, engine 301 includes clutch 332 configured to operatively couple second drive shaft 308 to first drive shaft 306. In some examples, clutch 332 may include an overrunning clutch. For example, clutch 332 may include an overrunning sprag clutch. In examples in which clutch 332 includes an overrunning sprag clutch, clutch 332 may be relatively smaller and relatively less weight than other clutch systems. Clutch 332 is coupled to second drive shaft 308. Clutch 332 may be positioned adjacent to first turbine stage bearing 316 to enable lubricant and/or cooling fluid to be delivered to clutch 332, to improve rotor dynamics of engine 301, or both. Clutch 332 may be configured to engage first drive shaft 306 when first drive shaft 306 and second drive shaft 308 are rotating at the same speed. For example, when second drive shaft 308 is being driven by motor-generator 330 during start-up, e.g., at a first rotational speed, clutch 332 may automatically couple second drive shaft 308 to first drive shaft 306. The first rotational speed may include any RPM between substantially zero RPM, such as when second drive shaft 308 first begins to rotate, and the ignition RPM. In examples in which clutch 332 includes an overrunning sprag clutch, clutch 332 may include a plurality of sprags, each sprag urged by a respective spring member of a plurality spring member against first drive shaft 306. The sprags may be oriented such that the plurality of sprags engage first drive shaft 306 when second drive shaft 308 is rotated in a first rotational direction. By automatically coupling the second drive shaft to the first drive shaft at a first rotational speed, the hybrid propulsion system may not require additional control systems to enable an operator to manually couple the second drive shaft to the first drive shaft.

Clutch 332 may be configured to disengage from first drive shaft 306 when the first driven shaft rotates faster than second drive shaft 308. For example, the plurality of sprags may not engage first drive shaft 306 when second drive shaft 308 rotates in a second rotational direction, opposite the first rotational direction, or rotates more slowly than first drive shaft 306. In some examples, when the expansion of hot combustion gases causes first turbine 302 to drive (and accelerate) the rotation of first drive shaft 306 after ignition, e.g., at a second rotational speed greater than the ignition RPM, clutch 332 may automatically decouple first drive shaft 306 from second drive shaft 308. Because N2 remains operatively coupled to motor-generator 330, motor-generator 330 may be configured to generate electrical power to drive at least one propulsor of propulsors 334 during steady-state operation of engine 301. By automatically decoupling first drive shaft 306 from second drive shaft 308 to at a first rotational speed, hybrid propulsion system 300 may not require additional control systems to detect when the RPM of first drive shaft 306 exceeds the RPM of second drive shaft 308, to enable an operator to manually decouple first drive shaft 306 from second drive shaft 308, or both. In this way, clutch 332 may engage first drive shaft 306 with second drive shaft 308 during start-up and disengage first drive shaft 306 from second drive shaft 308 during steady-state operation.

Figure 4:
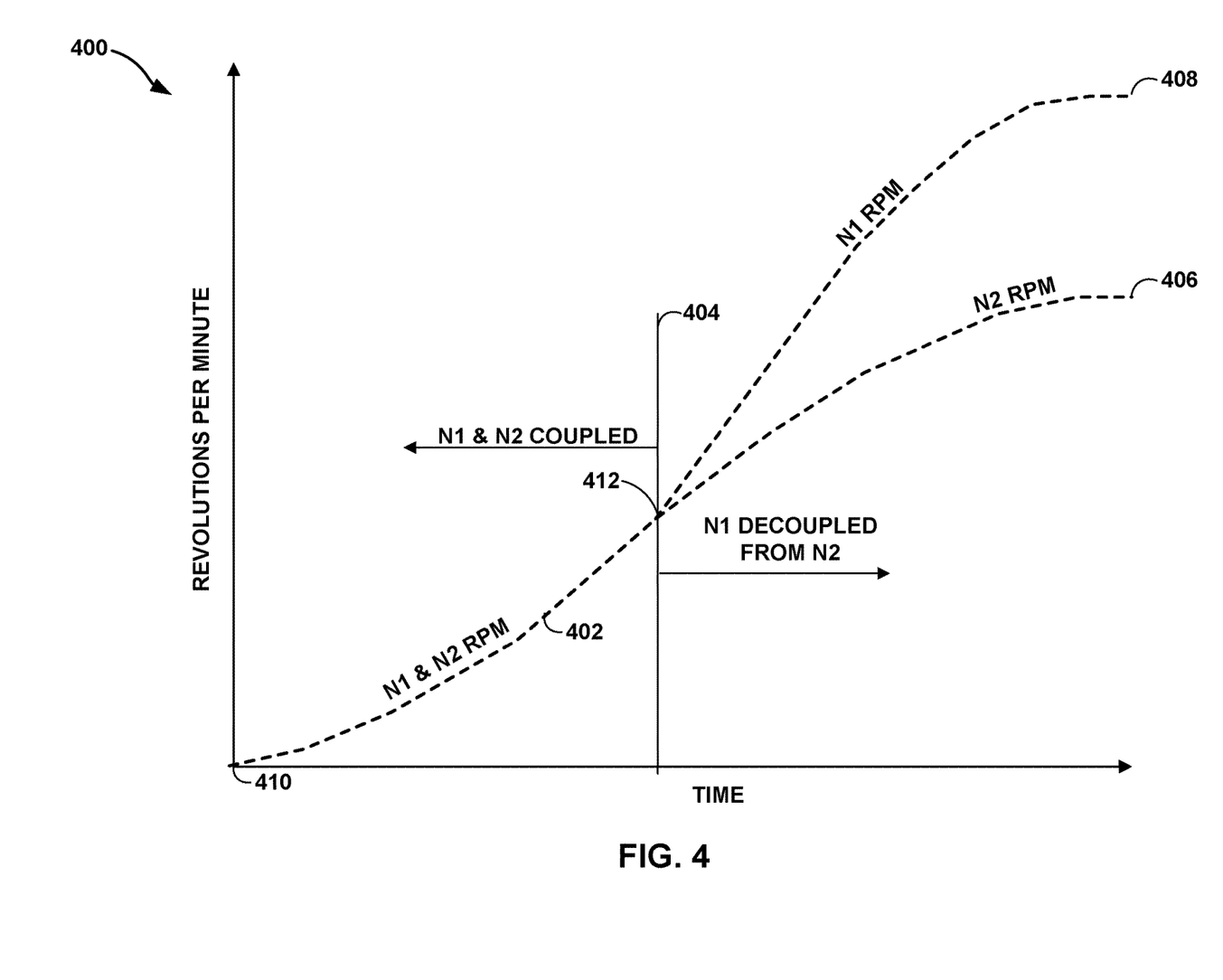
FIG. 4 is a plot illustrating start-up of an example hybrid propulsion system including mechanical decoupling of a first drive shaft from a second drive shaft using a clutch, in accordance with an example of the present disclosure.

FIG. 4 is a plot illustrating start-up of an example hybrid propulsion system 300 including mechanical decoupling of first drive shaft 306 from second drive shaft 308 using clutch 332. As illustrated in FIG. 4, during start-up, when motor-generator 330 provides shaft work to second drive shaft 308 which is coupled to first drive shaft 306 by clutch 332, first drive shaft 306 (e.g., N1) and second drive shaft 308 (e.g., N2) may rotate at the same or nearly the same RPM from an initial RPM 410 to an ignition RPM 412, as indicated by line 402. In some examples, initial RPM 410 may include an RPM of about zero RPM. In some examples, the ignition RPM 412 may include an RPM sufficient to enable compressor 310 to deliver enough air to the combustion chamber of engine 301 to prevent a hot start. At or near ignition RPM 412, as indicated by vertical line 404, clutch 332 may disengage second drive shaft 308 from first drive shaft 306. This may allow the RPM of first turbine stage 302 to increase to a steady-state operational RPM, as indicated by line 408. As indicated by line 406, the RPM of second turbine stage 304 may also increase to a slower steady-state operational RPM, albeit at a slower rate compared to first turbine stage 402. The hybrid propulsion systems describe herein may be used to startup a gas turbine engine using any suitable technique.

Figure 5:
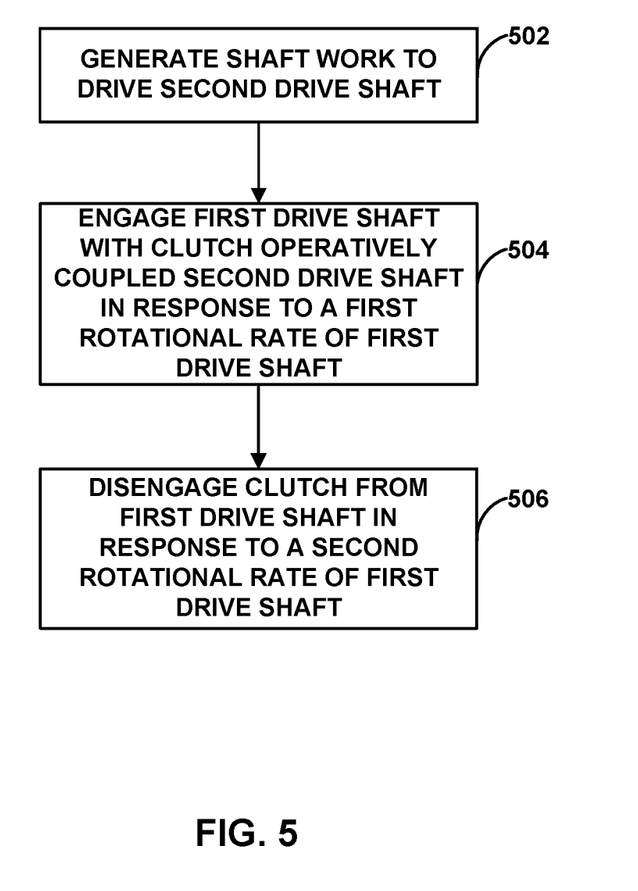
FIG. 5 is a flow diagram illustrating example operations performed to start-up an example hybrid propulsion system using a starter motor-generator, in accordance with an example of the present disclosure.

FIG. 5 is a flow diagram illustrating an example operations performed to start-up an example hybrid propulsion system using a starter motor-generator. The operations illustrated in FIG. 5 are described with reference to hybrid propulsion systems 300, although a person of ordinary skill in the art will appreciate that similar operations may be used to start-up a gas turbine engine of a vehicle system, such as system 10, and that hybrid propulsion system 300 may be started using different operations.

In operation, motor-generator 330 may generate shaft work to drive second drive shaft 308 (502). As discussed above, second drive shaft 308 is operatively coupled to gas turbine engine 301. For example, gas turbine engine 301 includes first turbine stage 302 operatively coupled to first drive shaft 306 and second turbine stage 304 operatively coupled to second drive shaft 308. In some examples, motor-generator 330 may be directly mechanically coupled to second drive shaft 308. For example, motor-generator 330 may be configured to replace an accessory gearbox of gas turbine engine 301 to be positioned to directly coupled to second drive shaft 308.

Clutch 332 may engage first drive shaft 306 in response to a first rotational rate of first drive shaft 306 (504). For example, the first rotational rate of first drive shaft 306 may include a plurality of first rotational rates defining a startup operation of gas turbine engine 301, as discussed above. In some examples, engaging first drive shaft 306 may include automatically engaging, by clutch 332, first drive shaft 306 in response to the first rotational rate of first drive shaft 306. As discussed above, clutch 332 may include an overrunning clutch, such as an overrunning sprag clutch. In this way, the technique may include automatically coupling motor-generator 330 to first drive shaft 306 via second drive shaft 308 and clutch 332 to rotate first turbine stage 302 and compressor 310.

Clutch 332 may disengage from first drive shaft 306 in response to a second rotational rate of first drive shaft 306 (506). For example, the second rotational rate may include a plurality of second rotational rates defining a steady-state operation of gas turbine engine 301, as discussed above. In some examples, disengaging first drive shaft 306 comprises automatically disengaging first drive shaft 306 in response to the second rotational rate of first drive shaft 306.

In some examples, the technique may include, before disengaging clutch 332, burning a fuel in gas turbine engine 301, e.g., in a combustion chamber of gas turbine engine 301, to drive rotation of first turbine stage 302. For example, as discussed above, at an ignition RPM, fuel may be delivered to and ignited in the combustion chamber of gas turbine engine 301. Combustion gases from the combustion chamber may drive the rotation of first turbine stage 302 and second turbine stage 304 to facilitate a continuous combustion process, or other combustion process, as described above, to achieve a steady-state operation.

As discussed above, hybrid propulsion system 300 includes propulsors 334. In some examples, the technique may include, after disengaging clutch 332, driving, by second drive shaft 308, motor-generator 330 to generate electrical power to drive at least one propulsor of propulsors 334. In other words, after start-up, and after gas turbine engine 301 has come up to speed, hybrid propulsion system 300 may operate normally and without necessarily relying on any additional assist from motor-generator 330.

The following clauses illustrate example subject matter describe herein.

Clause 1. A hybrid propulsion system comprising: a plurality of propulsors; a first drive shaft; a second drive shaft; a gas turbine engine comprising: a first turbine stage operatively coupled to the first drive shaft; and a second turbine stage operatively coupled to the second drive shaft; a motor-generator operatively coupled to the second drive shaft and configured to: generate electrical power to drive at least one propulsor of the plurality of propulsors; and selectively drive the second shaft; and a clutch configured to operatively couple the second drive shaft to the first drive shaft.

Clause 2. The hybrid propulsion system of clause 1, wherein the clutch comprises an overrunning sprag clutch.

Clause 3. The hybrid propulsion system of clause 1 or 2, wherein the clutch is configured to automatically couple the first drive shaft to the second drive shaft in response to a first rotational rate of the first drive shaft and automatically decouple the first drive shaft from the second drive shaft at a second rotational rate of the first drive shaft.

Clause 4. The hybrid propulsion system of clause 3, wherein the second rotational rate is greater than the first rotational rate.

Clause 5. The hybrid propulsion system of clause 3 or 4, wherein the first rotational rate comprises a plurality of first rotational rates defining a startup operation of the gas turbine engine.

Clause 6. The hybrid propulsion system of any one of clauses 3 through 5, wherein the second rotational rate comprises a plurality of second rotational rates defining a steady-state operation of the gas turbine engine.

Clause 7. The hybrid propulsion system of any one of clauses 1 through 6, wherein gas turbine engine further comprises a compressor, wherein the first shaft is operatively coupled to the compressor.

Clause 8. The hybrid propulsion system of any one of clauses 1 through 7, wherein the motor-generator is configured to generate between 50 kilowatts (kW) and about 500 kW of electrical power.

Clause 9. The hybrid propulsion system of any one of clauses 1 through 8, wherein the hybrid propulsion system does not include an accessory gearbox.

Clause 10. The hybrid propulsion system of any one of clauses 1 through 9, wherein the motor-generator is directly mechanically coupled to the second drive shaft.

Clause 11. A method of operating a hybrid propulsion system, the method comprising:
generating, by a motor-generator, shaft work to drive a second drive shaft, wherein the second drive shaft is operatively coupled to a gas turbine engine, wherein the gas turbine engine comprises: a first turbine stage operatively coupled to a first drive shaft; and a second turbine stage operatively coupled to the second drive shaft, engaging, by a clutch operatively coupled to the second drive shaft, the first drive shaft in response to a first rotational rate of the first drive shaft; and disengaging the clutch from the first drive shaft in response to a second rotational rate of the first drive shaft.

Clause 12. The method of clause 11, wherein the clutch comprises an overrunning sprag clutch.

Clause 13. The method of clause 11 or 12, wherein the hybrid propulsion system further comprises a plurality of propulsors, wherein the method further comprises, after disengaging the clutch, driving, by the second drive shaft, the motor-generator to generate electrical power to drive at least one propulsor of the plurality of propulsors.

Clause 14. The method of any one of clauses 11 through 13, wherein the hybrid propulsion system does not include an accessory gearbox.

Clause 15. The method of any one of clauses 11 through 14, wherein engaging the first drive shaft comprises automatically engaging, by the clutch, the first drive shaft in response to a first rotational rate of the first drive shaft.

Clause 16. The method of clause 15, wherein the first rotational rate comprises a plurality of first rotational rates defining a startup operation of the gas turbine engine.

Clause 17. The method of any one of clauses 11 through 16, wherein disengaging the first drive shaft comprises automatically disengaging the first drive shaft in response to a second rotational rate of the first drive shaft.

Clause 18. The method of clause 17, wherein the second rotational rate comprises a plurality of second rotational rates defining a steady-state operation of the gas turbine engine.

Clause 19. The method of any one of clauses 11 through 18, wherein the motor-generator is directly mechanically coupled to the second drive shaft.

Clause 20. A hybrid propulsion system comprising: a plurality of propulsors, each respective propulsor of the plurality of propulsors comprising a respective electrical motor mechanically coupled to a respective propeller; a gas turbine engine comprising: a first turbine stage operatively coupled to a first drive shaft; and a second turbine stage operatively coupled to a second drive shaft; a motor-generator directly mechanically coupled to the second drive shaft, wherein the motor-generator is configured to: generate electrical power to drive at least one motor of the plurality of propulsors during a steady-state operation of the gas turbine engine; and selectively drive the second shaft during a start-up operation of the gas turbine engine; and a clutch coupled to the second drive shaft and configured to automatically engage the first drive shaft during the start-up operation and automatically disengage the first drive shaft during the steady-state operation.

Various examples have been described. These and other examples are within the scope of the following claims.

What is claimed is:

1. A hybrid propulsion system comprising:
a plurality of propulsors;
a first drive shaft;
a second drive shaft;
a gas turbine engine comprising:
   a first turbine stage operatively coupled to the first drive shaft, the first turbine stage comprising a low pressure (N1) turbine stage; and
   a second turbine stage operatively coupled to the second drive shaft, the second turbine stage comprising a high pressure (N2) turbine stage;
a motor-generator directly mechanically coupled to the second drive shaft and configured to:
   generate, during a steady-state operation of the gas turbine engine, electrical power;
   drive, during the steady-state operation of the gas turbine engine and using the electrical power, at least one propulsor of the plurality of propulsors to propel an airframe; and
   selectively drive the second shaft; and
a clutch configured to operatively couple, during a start-up operation of the gas turbine engine, the second drive shaft to the first drive shaft, wherein the clutch is configured to automatically couple the first drive shaft to the second drive shaft in response to a first rotational rate of the first drive shaft and automatically decouple the first drive shaft from the second drive shaft at a second rotational rate of the first drive shaft, and wherein the second rotational rate is greater than the first rotational rate.

2. The hybrid propulsion system of claim 1, wherein the clutch comprises an overrunning sprag clutch.

3. The hybrid propulsion system of claim 1, wherein the first rotational rate comprises a plurality of first rotational rates defining the startup operation of the gas turbine engine.

4. The hybrid propulsion system of claim 1, wherein the second rotational rate comprises a plurality of second rotational rates defining the steady-state operation of the gas turbine engine.

5. The hybrid propulsion system of claim 1, wherein gas turbine engine further comprises a compressor, wherein the first shaft is operatively coupled to the compressor.

6. The hybrid propulsion system of claim 1, wherein the motor-generator is configured to generate between 100 kilowatts (kW) and 500 kW of electrical power.

7. The hybrid propulsion system of claim 1, wherein the hybrid propulsion system does not include an accessory gearbox.

8. A method of operating a hybrid propulsion system, the method comprising:

generating, by a motor-generator, shaft work to drive a second drive shaft, wherein the second drive shaft is operatively coupled to a gas turbine engine, wherein the motor-generator is directly mechanically coupled to the second drive shaft, and wherein the gas turbine engine comprises:
   a first turbine stage operatively coupled to a first drive shaft, the first turbine stage comprising a low pressure (N1) turbine stage; and
   a second turbine stage operatively coupled to the second drive shaft, the second turbine stage comprising a high pressure (N2) turbine stage,
automatically engaging, by a clutch operatively coupled to the second drive shaft, the first drive shaft in response to a first rotational rate of the first drive shaft during a start-up operation of the gas turbine engine;
automatically disengaging the clutch from the first drive shaft in response to a second rotational rate of the first drive shaft during a steady-state operation of the gas turbine engine, wherein the second rotational rate is greater than the first rotational rate;
generating, by the motor-generator, after disengaging the clutch during the steady-state operation of the gas turbine engine, electrical power; and
driving, during the steady-state operation of the gas turbine engine and using the electrical power, at least one propulsor to propel an airframe..

9. The method of claim 8, wherein the clutch comprises an overrunning sprag clutch.

10. The method of claim 8, wherein the hybrid propulsion system does not include an accessory gearbox.

11. The method of claim 8, wherein the first rotational rate comprises a plurality of first rotational rates defining the startup operation of the gas turbine engine.

12. The method of claim 8, wherein the second rotational rate comprises a plurality of second rotational rates defining the steady-state operation of the gas turbine engine.

13. A hybrid propulsion system comprising:
a plurality of propulsors, each respective propulsor of the plurality of propulsors comprising a respective electrical motor mechanically coupled to a respective propeller;
a gas turbine engine comprising:
   a first turbine stage operatively coupled to a first drive shaft, the first turbine stage comprising a low pressure (N1) turbine stage; and
   a second turbine stage operatively coupled to a second drive shaft, the second turbine stage comprising a high pressure (N2) turbine stage;
a motor-generator directly mechanically coupled to the second drive shaft, wherein the motor-generator is configured to:
   generate electrical power;
   drive, during a steady-state operation of the gas turbine engine and using the electrical power, at least one of the respective electrical motors coupled to each of the plurality of propulsors; and
   selectively drive the second shaft during a start-up operation of the gas turbine engine; and
a clutch coupled to the second drive shaft and configured to automatically engage the first drive shaft during the start-up operation and automatically disengage the first drive shaft during the steady-state operation, wherein the clutch is configured to automatically couple the first drive shaft to the second drive shaft in response to a first rotational rate of the first drive shaft and automatically decouple the first drive shaft from the second drive shaft at a second rotational rate of the first drive shaft, and wherein the second rotational rate is greater than the first rotational rate.

\* \* \* \* \*